(12) United States Patent
Satoh et al.

(10) Patent No.: US 6,327,115 B1
(45) Date of Patent: Dec. 4, 2001

(54) DISK DRIVE APPARATUS, ATTACHMENT STRUCTURE, AND ATTACHMENT METHOD

(75) Inventors: Kiyoshi Satoh, Ayase; Masakazu Sasaki, Kanagawa-ken; Hiroki Kitahori, Fujisawa; Sunao Nemoto, Kanagawa-ken, all of (JP); David Albrecht, San Jose; Gregory Frees, Los Altos, both of CA (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 08/541,948

(22) Filed: Oct. 10, 1995

(30) Foreign Application Priority Data

Oct. 28, 1994 (JP) .................................... 6-265130

(51) Int. Cl.$^7$ .................................................. G11B 19/20
(52) U.S. Cl. ..................................... 360/99.08; 360/98.07
(58) Field of Search ........................... 360/97.01, 97.02, 360/97.03, 98.07, 99.04, 99.08; 310/67 R, 90, 156

(56) References Cited

U.S. PATENT DOCUMENTS

| | | | |
|---|---|---|---|
| 4,905,110 | * | 2/1990 | Krum et al. ...................... 360/99.08 |
| 5,200,866 | * | 4/1993 | Frugé et al. ...................... 360/99.08 |
| 5,305,163 | * | 4/1994 | Holm ................................ 360/99.08 |
| 5,379,171 | * | 1/1995 | Morehouse et al. ................. 360/105 |
| 5,479,304 | * | 12/1995 | Morita .............................. 360/99.08 |
| 5,483,397 | * | 1/1996 | Gifford et al. .................... 360/97.01 |
| 5,530,602 | * | 6/1996 | Boutaghou et al. .................. 360/75 |

FOREIGN PATENT DOCUMENTS

| | | | |
|---|---|---|---|
| 55157166 | * | 12/1980 | (JP) .................................... 360/99.08 |
| 1312771 | * | 12/1989 | (JP) .................................... 360/99.08 |

* cited by examiner

Primary Examiner—David L. Ometz
(74) Attorney, Agent, or Firm—Altera Law Group, LLC

(57) ABSTRACT

An attachment structure and method for a disk drive apparatus for making the coupling resonance frequency of a hard disk drive the same whether one disk is loaded or a plurality of disks are loaded based upon parameters obtained from a simulation model. The modeling of a coupling vibration for one disk and for two disks is performed using a coupling vibration model of a linear two degree-of-freedom system. The component parts of a spindle motor providing a spring constant $K_p$ are adjusted so that the resonance frequency determined by coupling that of a spindle motor with that of the disk(s) is made much the same whether one disk or two disks are loaded. This adjustment enables stable track following to be secured without the need for adding dummy disks and other parts.

10 Claims, 8 Drawing Sheets

COUPLING VIBRATION OF A LINEAR TWO-DEGREE-OF-FREEDOM SYSTEM

COUPLING VIBRATION FOR ONE DISK LOADED

COUPLING VIBRATION FOR TWO DISKS LOADED

DISK DRIVE APPARATUS, ATTACHMENT STRUCTURE, AND ATTACHMENT METHOD

BACKGROUND OF THE INVENTION

1. Field of the Invention

The present invention relates in general to a disk drive apparatus attachment structure and attachment method, and more particularly, to a disk drive apparatus attachment structure and attachment method for attaching a spindle motor and disks to a disk drive apparatus.

2. Description of Related Art

Recently, in disk drive apparatuses such as hard disk drives, it is generally seen as a product lineup to use one and the same enclosure case and to provide products with a single disk enclosed in the enclosure case and products with two (or more) disks enclosed in the enclosed case. In these disk drive apparatuses, since a mechanical resonance frequency of the enclosure case greatly affects the stability of its head during track following, a mechanical resonance frequency must be so designed as to be the same for the one-disk version as for the two-disk (or not less than three) version.

For this reason, in conventional disk drive apparatus attachment structures, there are, for instance, two types: one where a two-disk version is set in the basic design and one dummy disk is added for the one-disk version; and the other where the shaft rigidity of the spindle motor for the one-disk version is deliberately lowered to be the same as for a two-disk version.

However, on the one hand, since originally unnecessary parts come to be used as dummy disks, the number of parts increases, thereby causing waste. On the other hand, to change the shaft rigidity of the spindle motor results in the provision of several types of parts which dispense originally with one type.

In this way, conventional disk drive apparatus attachment structures have problems in that the cost increases and the number of parts to be controlled becomes larger.

It can be seen then that there is a need for a disk drive apparatus attachment structure, a disk drive apparatus, and a disk drive apparatus attachment method wherein, even when varying the number of disks, the instability of the track following of the magnetic head can be prevented using one and the same enclosure case in a product lineup.

SUMMARY OF THE INVENTION

To overcome the limitations in the prior art described above, and to overcome other limitations that will become apparent upon reading and understanding the present specification, the present invention discloses a disk drive apparatus attachment structure and attachment method for attaching a spindle motor and disks to a disk drive apparatus.

The present invention solves the above-described problems by providing an attachment structure and attachment method which prevents instability of the track following of the magnetic head using one and the same enclosure case in a product lineup, even when the number of disks varies.

A system in accordance with the principles of the present invention comprises a spindle motor that drives a shaft at a predetermined rotational speed, at least one disk with an inner periphery fixed on the shaft of said spindle motor, at least one head for writing or reading information while following a track of said disk, and a disk drive apparatus attachment structure for attaching the spindle motor and the disk to the disk drive apparatus. An artificial movement model is used to predicate a mechanical resonance frequency determined by the coupling of the pitching mode mechanical resonance frequency of a no-load spindle motor and the primary mechanical resonance frequency of one disk to be loaded and a mechanical resonance frequency determined by the coupling of the pitching mode mechanical resonance frequency of the no-load spindle motor and the primary mechanical resonance frequency of a plurality of disks to be loaded. Further, a spindle motor and a disk are selected based on the predicted values so that the difference in the mechanical resonance frequency determined by coupling for each number of disks loaded may be minimized independently of the number of disks loaded.

An aspect of the present invention is that the step of adjusting parameters is based on the parameters obtained from a free vibration model with a spring-mass system such that a pair consisting of the pitching mode mechanical resonance frequency of a no-load spindle motor and the primary mechanical resonance frequency of the disks loaded is transformed so that the mechanical resonance frequency determined by coupling the pitching mode mechanical resonance frequency of a disk loading spindle motor with the primary mechanical resonance frequency of disks to be loaded does not differ whether one disk or a plurality of disks are loaded.

Another aspect of the present invention is that said shaft assembly is made into a cartridge-like subassembly by previously applying axial opposingly directed preloads to the outer and inner rings of the bearing.

Still another aspect of the present invention is that the spindle motor and disks are chosen so that the variance in the mechanical resonance frequency whether one or a plurality of disks are load is minimized.

Yet another aspect of the present invention is that stable track following can be secured independently of the number of disks loaded.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a disk drive apparatus attachment structure and attachment method for attaching a spindle motor and disks to a disk drive apparatus. Accordingly, the spindle motor and disks are chosen so that the variance in the mechanical resonance frequency whether one or a plurality of disks are load is minimized.

Figure 1:
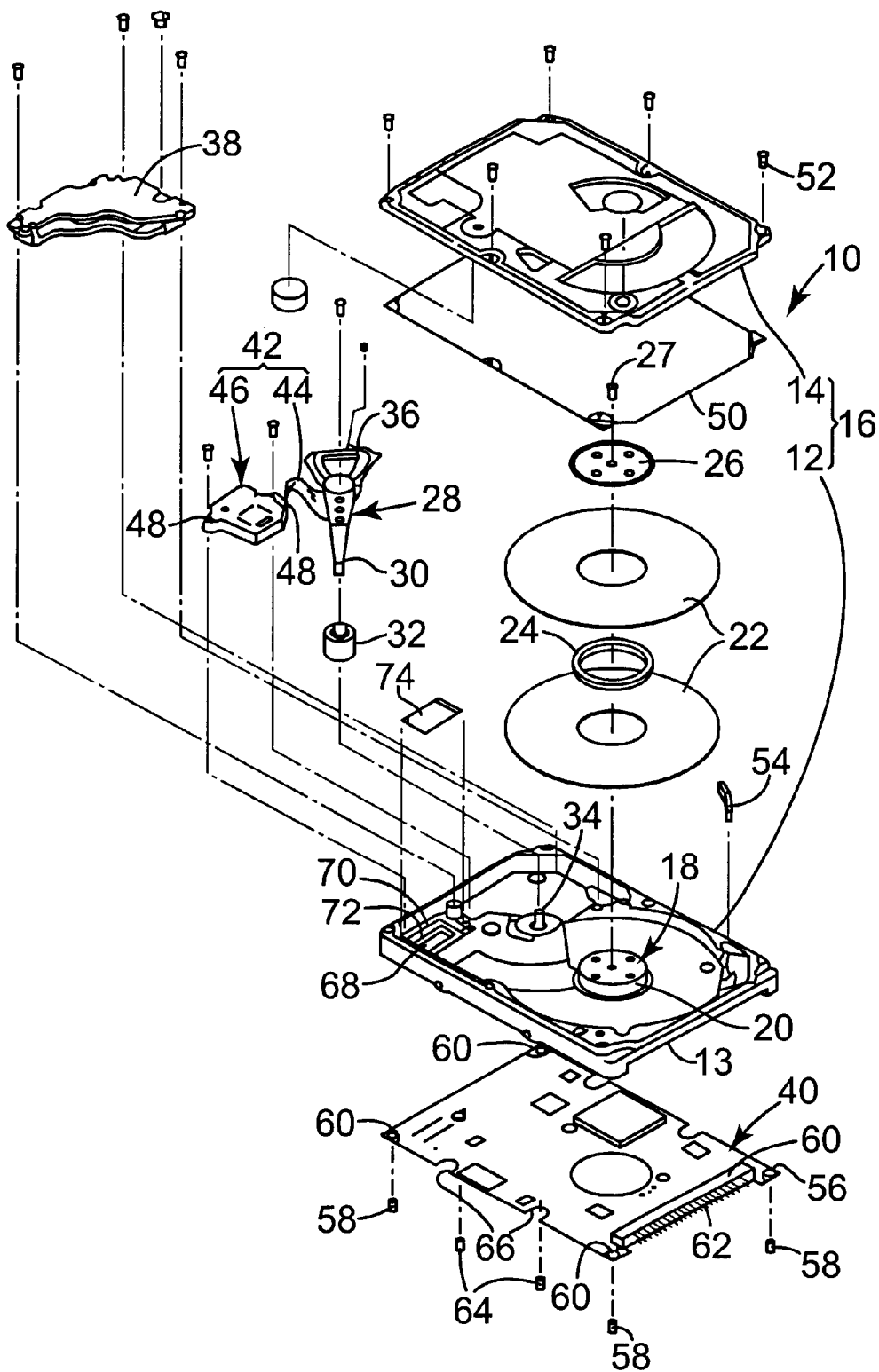
FIG. 1 is an exploded perspective illustration of a hard disk drive to which one embodiment of a disk drive apparatus according to the present invention is applied.

FIG. 1 illustrates a hard disk drive 10 wherein the open top of the shallow bottom box-shaped base 12 is closed with a cover 14 to form a enclosure case 16. This enclosure case 16 is shaped like a rectangular thin box and can be disposed horizontally in a computer or keyboard.

The cover 14 is fastened with a vise 52 via a rectangular-frame-shaped seal component 50 on the base 12 and the interior of the enclosure case 16 is airtight. Also, the air in the enclosure case 16 is cleaned with an air filter 54.

In the enclosure case 16, as detailed later, a hub-in-structured spindle motor 18 is provided slightly toward the end apart from the center of the base 12. On the periphery of the hub 20 of the spindle motor 18, plural, e.g., two, magnetic disks 22 are mated via a spacer 24 onto the spindle shaft, loaded by pushing of the clamp 26, and rotationally driven with the spindle motor 18, which operates at 4500 rpm.

Further, in the enclosure case 16, a carriage 28 is provided. The carriage 28 has a magnetic head 30 at one end, is supported via the pivot 32 on the pin 34 rising up on the base 12 at the middle, and is freely rotational. At the other end of the carriage 28, the coil 36 for a voice coil motor (VCM) is provided, the carriage 28 is revolved by the VCM 38 provided to cooperate with this coil 36 for the VCM in the enclosure case 16.

To the outer (lower) surface of the base 12, a card 40 as a circuit base is attached and is made up of a rectangle large enough to cover the outer surface of the base 12. Between the card 40 and said spindle motor 18 is performed the input/output of electric power and signals for motor driving, while between the card 40 and the carriage 28 is performed the input/output of electric power and signals for power to the coil 36 and for read/write of the magnetic head 30. Input/output between the card 40 and the carriage 28 is performed via a flexible cable (FPC) 42. The FPC 42 is flexible, has a thin flat shape, and comprises a wide and extended nonmovable part 46 and a narrow movable part 44 extending vertically in the extension direction of the nonmovable part 46 at the base end of the nonmovable part 46 in one piece. The extending tip of the movable part 44 is a slightly widened and is fastened with vises outside the carriage 28 by the use of fitting holes 48 formed on the widened portion. The movable part 44 can follow the revolving carriage 28 on account of its flexibility.

On the base 12, a rectangular connecting opening 68 is opened opposite the card 40 at a corner spaced from the disposed position of the spindle motor 18. On the opening rim 70 of the connecting opening 68 is formed a step difference 72, with which a rectangular frame-like seal component 74 is provided to mate.

The base 12 has a raised-bottom shape and the circumference of the lower surface of the base 12 extends downward. Vise holes 56 are individually formed at four corners of the card 40 and female screws (not shown) are formed correspondingly at the four corners of the outer surface of the base 12. When vises 58 are screwed through the vise holes 56 with female screws (not shown), the card 40 is fixed on the lower surface of the base 12 with the circumference of the card 40 kept pushed in contact with the fringe of the lower surface of the base 12.

The flat connector 60 is provided along one side of the card 40, and the connector pin 62 of the flat connector 60 is exposed from the notch 13 formed correspondingly along one side of the fringe of the lower surface of the base 12. Consequently, the flat connector 60 becomes connectable to the CPU of the main system.

Further, female screws (not shown) are formed on the fringe of the lower surface of the base and the present hard disk drive 10 which is fitted in a computer or in a keyboard by using a screw 64 to be screwed in female screws through the notch 66 cut off in a U-shape on the fringe of the card 40.

Figure 2:
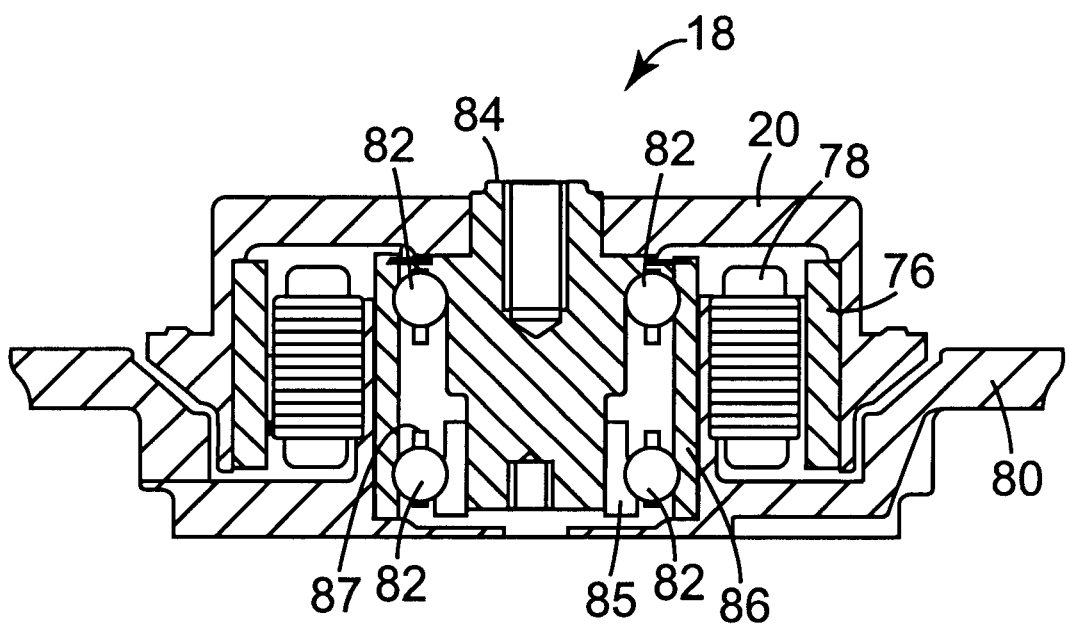
FIG. 2 is a longitudinal section of a spindle motor illustrating the assembled state of a hub magnet assembly, shaft cartridge assembly, and flange stator assembly.

Referring to FIGS. 2 and 3, the spindle motor 18 used for the present hard disk drive 10 will be described next.

Figure 3A:
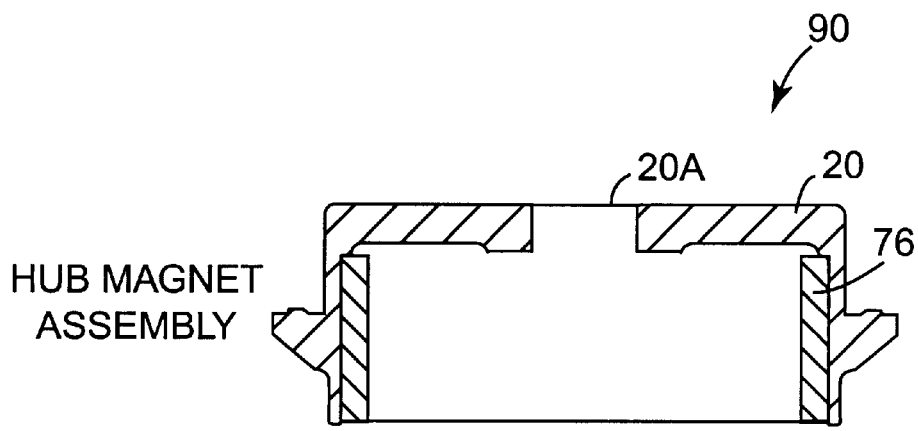
FIGS. 3 a–c are a longitudinal section illustrating each assembly step of a spindle motor separately.
Figure 3B:
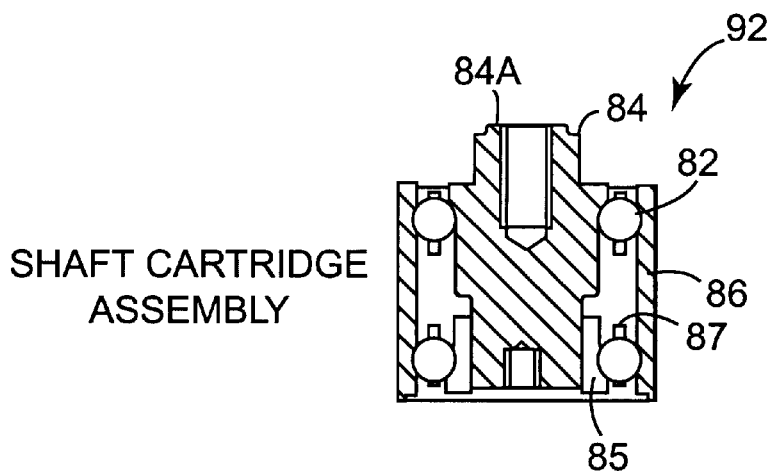
Figure 3C:
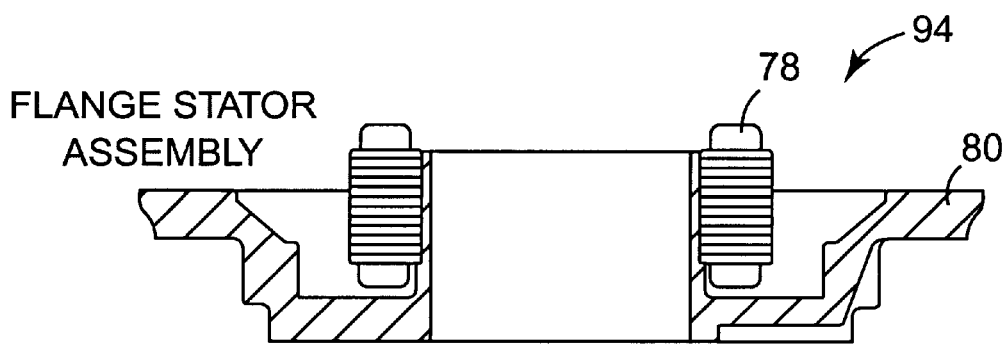

As shown in FIGS. 3a–c, this spindle motor 18 comprises assemblies of a hub magnet assembly 90, shaft cartridge assembly 92, and flange stator assembly 94.

The hub magnet assembly 90 comprises a closed upward and opened downward cylindrical hub 20 and a cylindrical magnet 76 fixed in the inside of the hub 20 (cf. FIG. 3a). The flange stator assembly 94 comprises a stator 78 (3 phases and 8 poles) having 12 slots placed circularly at positions spaced from the center and a flange 80 (cf. FIG. 3c). In the space made up by the hub magnet assembly 90 and the flange stator assembly 94 is housed a shaft cartridge assembly 92. The shaft cartridge assembly 92 comprises a shaft 84, a cartridge sleeve 86 forming the outer ring of the shaft cartridge assembly 92, and plural ball bearings 82 for clamping the shaft 84 on the shaft sleeve 86, and a retainer 87 for holding the ball bearings 82 at equal intervals on the circumference (cf. FIG. 3b). A grooving for determining the fixed position of ball bearings 82 is made on the shaft 84 and the cartridge sleeve 86, the ball bearings 82 are positioned in these grooves, and the inner rings 85 are adhesively fixed with adhesive to eliminate the play in the rotation of the shaft 84. A head is provided on the shaft 84 in such a manner as to mate with a shaft hole 20A provided at the top center of the hub 20. On the one hand, a female screw 84A is provided on the head of the shaft 84 and the end of the screw 27 is screwed in the female screw 84A (cf. FIG. 1). On the other hand, the shaft cartridge assembly 92 is housed inside the cylindrically disposed stator 78, and assembling these individual assemblies will lead to the completion of a spindle motor 18.

Like this, the shaft cartridge assembly 92 is a child component of the spindle motor 18 and the ball bearings 82 are fixedly positioned at predetermined positions and attached. On the periphery of the hub 20, magnetic disks 22 are fixed and attached via spacers 24 with a clamp 26 and a screw 27.

In the present hard disk drive (HDD) 10, such a constitution keeps the mechanical resonant frequency of a magnetic disk version and two magnetic disks almost the same based on parameters obtained from the spring mass system described.

Operations of a HDD 10 according to the present embodiment will be described next.

Upon receiving a given signal from the CPU of the main system, power is supplied from the card 40 to the spindle motor 18 and the spindle motor 18 rotates at a given speed (4,500 rpm). Power is then supplied from the card 40 to the coil 36 of the carriage 28 to revolve the carriage 28 and the magnetic head 30 is controlled at a position in the radial direction of the magnetic disk 22 to read or write a piece of magnetic information while following the track of the magnetic disk 22. Incidentally, these actions are controlled by the CPU (not shown) provided in the HDD 10.

If the ball bearings 82 are not firmly fixed with the shaft 84 of the inner ring and the cartridge 86 of the outer ring, the rotation of the spindle motor 18 causes inconveniences such as play and badly affects acoustic characteristics.

Figure 4A:
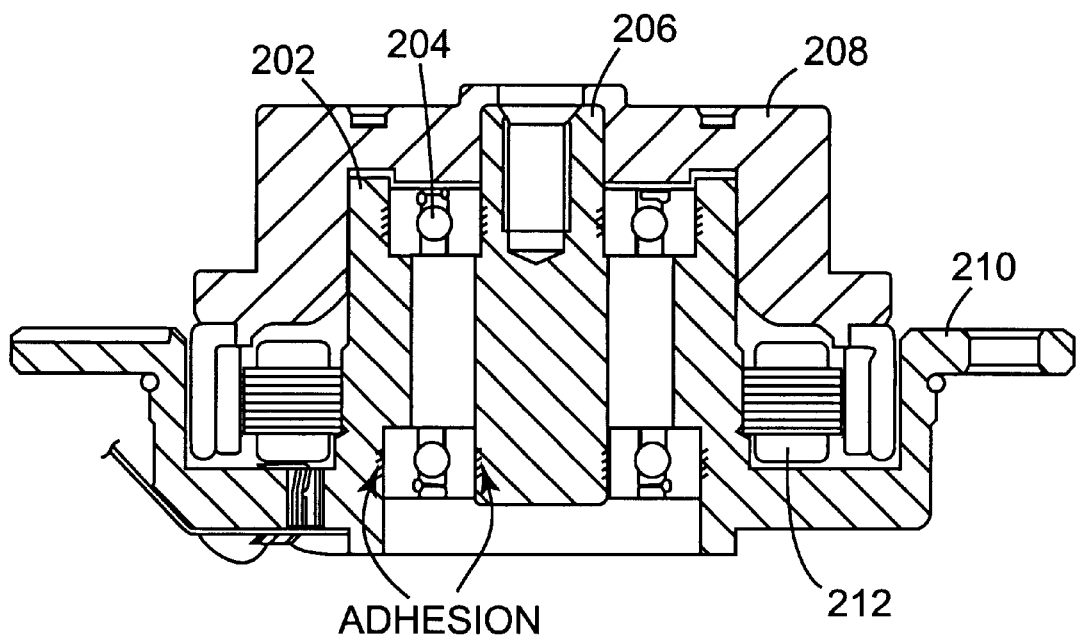
FIGS. 4 a–b are a longitudinal section of a conventional spindle motor and an explanatory drawing of preloading applied to the ball bearing, respectively.
Figure 4B:
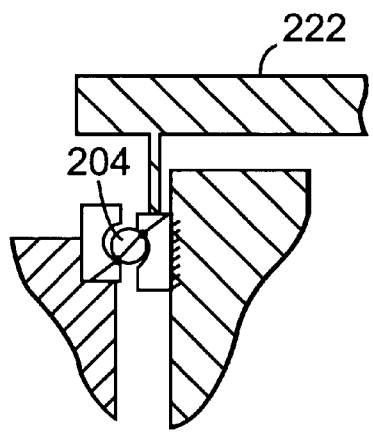

As shown in FIG. 4a, the conventional spindle motor comprises a sleeve 202, bearings 204, a shaft 206, a hub 208, a flange 210, and a stator 212. As shown in FIG. 4b, this spindle motor uses two bearings, prepared as standards, vertically, and has them fixed after hardening of the adhesive under a preload with a dead weight 222. Such a spindle motor has so large a number of control factors in the assembly process, such as, e.g., the finished size and verticality of the sleeve 202 for housing the bearings, the finished size and fitting verticality of the shaft 206, the fitting slope of the bearings under preloaded conditions with a dead weight, the distribution conditions of a load with a dead weight, the coated quantity and adhesive circumstances of adhesives, and the adherence position of adhesive as to indicate a great variation in the finished state. Therefore, there was a great dispersion in the finished state. In addition, inconveniences in the spindle motor cannot be determined until after assemble is compiled.

A spindle motor 18 according to the present embodiment uses a child component made into a cartridge under a preload applied opposingly to a cartridge sleeve 86 of an outer ring and to a shaft 84 of an inner ring in an axial direction. Consequently, a performance check for the presence of play and other inconveniences can be carried out at the stage of assembly and an inconvenience, if any can be eliminated at the stage of assembly. Moreover, it is only required at the stage of completion to control the finished size and verticality of the shaft cartridge assembly 92 and the adhesive conditions involved in the attachment of the cartridge sleeve, and a smaller number of control elements can reduce a variance in the performance of the spindle motor 18 and reduce the cost of the spindle motor 18.

An attachment structure according to the present embodiment with a mechanical resonant frequency made much the same for a one-disk version and for a two-disk version will be described next.

Conventionally, the difference in the mechanical resonance frequency of a HDD between for one magnetic disk loaded and for two (or more) magnetic disks loaded has been considered simply attributable to the doubled load to the same spindle motor. However, the mechanical resonant frequency of a HDD as a whole was experimentally proven to be the coupled resonant frequency of the pitching mode mechanical resonant frequency of the no-load spindle motor itself and the primary mechanical resonant frequency of the magnetic disk with the inner face fixed on the spindle motor.

The pitching mode mechanical resonant frequency of the spindle motor, the primary mechanical resonant frequency of disk(s), and the coupled resonant frequency of these will be described first.

Figure 5A:
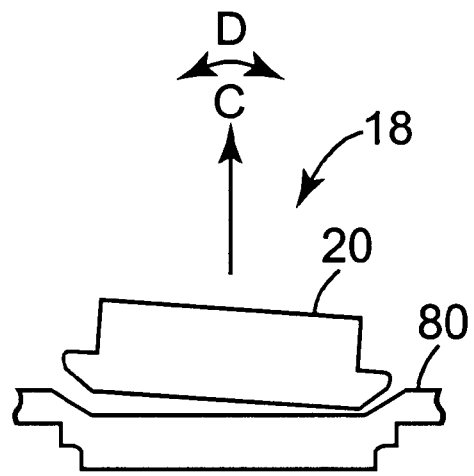
FIGS. 5 a–b are an explanatory drawing of a shaft-directional pitching vibration mode of a spindle motor and an explanatory drawing of the primary mechanical resonance frequency of disks.
Figure 5B:
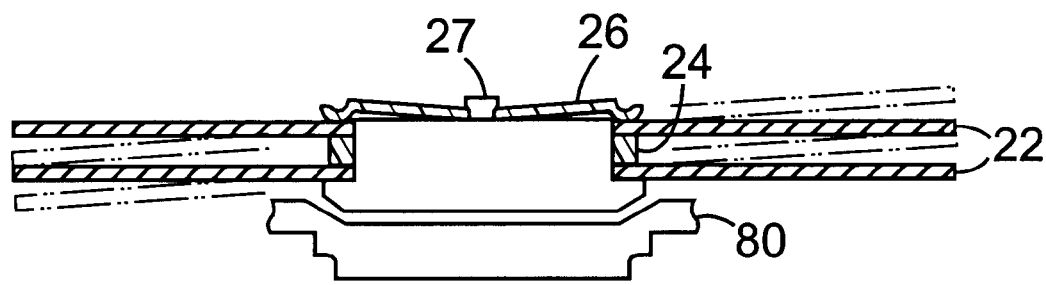

As shown in FIG. 5a, the no-load rotational drive of this spindle motor 18 causes a pitching mode mechanical resonance where the shaft 84 oscillates slanted (direction of arrow D in FIG. 5) from the vertical direction (direction of arrow C in FIG. 5). The pitching mode mechanical resonant frequency can be measured by striking the spindle motor 18 with an impulse hammer and picking up the vibration with an acceleration pickup in what is called a hammer test.

Figure 6:
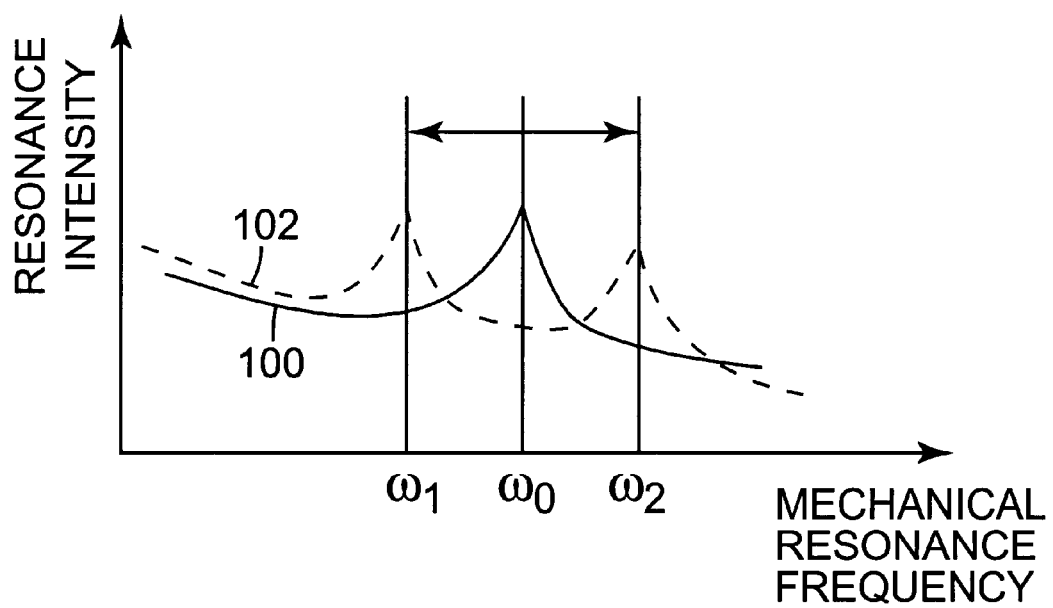
FIG. 6 is a graph illustrating the relationship of a resonance frequency and resonance intensity of a spindle motor at rest and in rotation.

FIG. 6 shows the results of the hammer test with the mechanical resonant frequency taken as the abscissa and with the resonance amplitude taken as the ordinate. On the one hand, the curve 100 shows the relationship between the pitching mode resonant frequency and the resonance amplitude for a resting spindle motor 18 and the resonance amplitude reaches a peak at the resonant frequency $\omega_0$. On the other hand, the curve 102 shows the relationship between the pitching mode resonant frequency and the resonance amplitude for the rotating spindle motor 18. As shown in FIG. 6, line 102 representing the pitching mode resonant frequency $\omega_0$ splits into a smaller resonant frequency $\omega_1$ and a larger resonant frequency $\omega_2$ than $\omega_0$ due to the gyro effect of the rotation of the spindle motor 18.

With the inner face of a disk 22 fixed on the hub 20 (cf. FIG. 5b), a spindle motor is driven to rotate. Assuming there is no pitching vibration in the spindle motor 18, a magnetic disk 22 generates a primary mechanical resonant frequency (hereinafter referred to as (0,1) resonant frequency). This (0, 1) resonant frequency is about 970 Hz for an aluminum magnetic disk 3.5 inches in diameter and 1.27 mm thick and about 610 Hz for an aluminum magnetic disk, 3.5 inches in diameter and 0.80 mm thick. There are also, incidentally, secondary, tertiary, and still higher harmonic mechanical resonant frequencies, but none of these affects the track following of the magnetic head 30.

Figure 7:
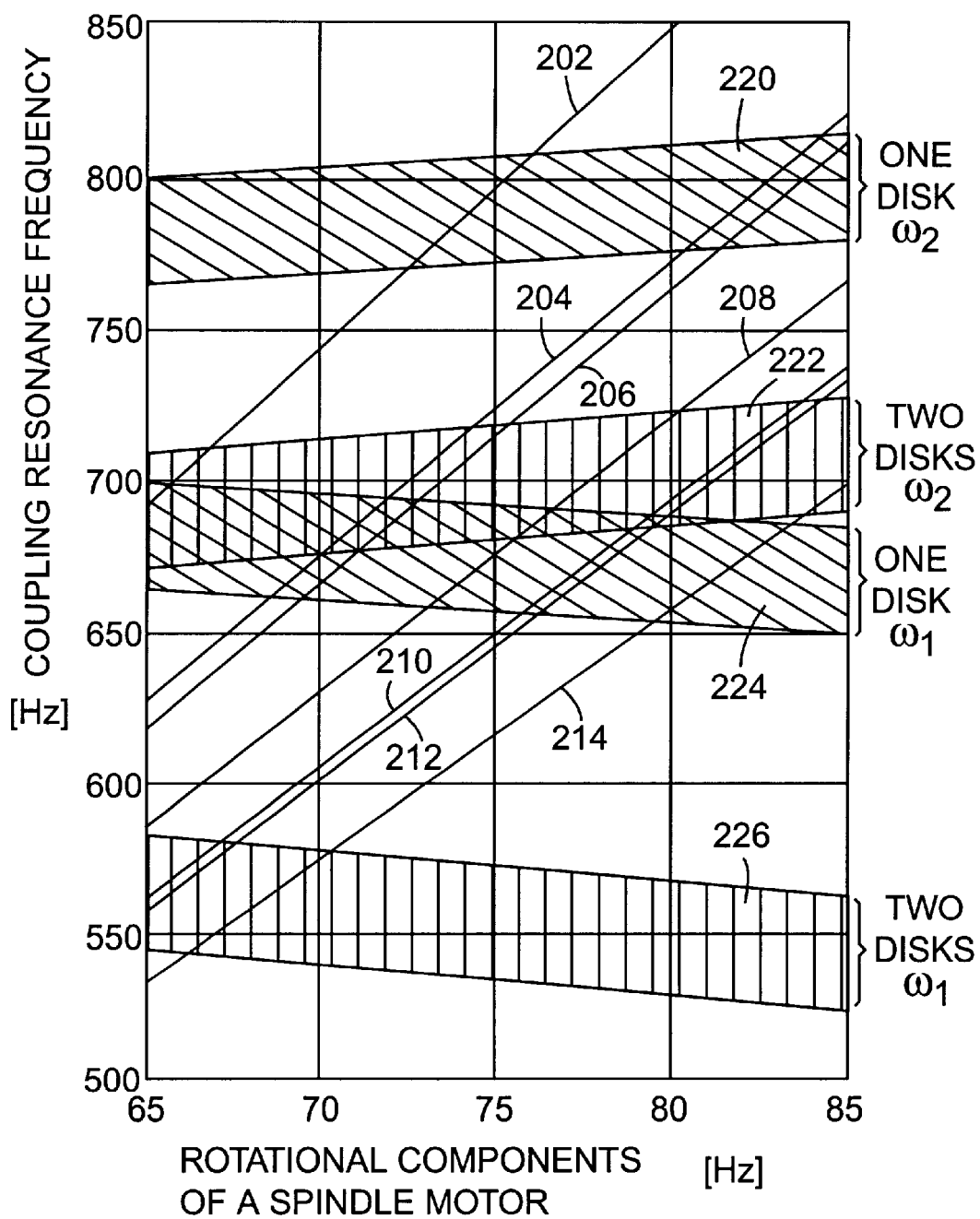
FIG. 7 is a diagram illustrating the coupling resonance frequency and the rotational components of a spindle motor.

FIG. 7 shows the coupled mechanical resonant frequency of the (0, 1) resonant frequency of a 0.80 t magnetic disk and the pitching mode resonant frequencies $\omega_1$ and $\omega_2$, with the rotary component of a spindle motor taken as the abscissa and the coupled resonant frequency taken as the ordinate, where the rotational component of the rated spindle motor is 75 Hz (4,500 rpm).

The straight line 202 shows a secondary component of an inner race in the radial direction (the radial direction of the shaft) while the straight line 204 shows a secondary component of an inner race in the thrust direction (the shaft direction). The straight line 206 shows a tertiary component of an outer race and the straight line 208 shows a secondary radial vibrational component derived from the ball bearings. Further, the straight line 210 shows a secondary component derived from the radial phase delay of an inner race, the straight line 212 shows a secondary thrust vibrational component derived from the ball bearing, and the straight line 214 shows a secondary radial vibrational component derived from the ball bearings.

The hatched region 220 shows the coupled resonant frequency region of one magnetic disk with the pitching mode resonant frequency of $\omega_2$, the region 222 shows the coupled resonant frequency region of two magnetic disks with the pitching mode resonant frequency of $\omega_2$, the region 224 shows the coupled resonant frequency region of one magnetic disks with the pitching mode resonant frequency of $\omega_1$, and the region 226 shows the coupled resonant frequency region of two disks with the pitching mode resonant frequency of $\omega_1$. That the coupled resonant frequency is represented by a region rather than by a straight line is for the purpose of allowing this region to scatter in the control of production. When the pitching mode resonant frequencies $\omega_1$ and $\omega_2$ are coincident with the straight lines 202, 204, 208, 210, 212, and 214, the resonance amplitude is amplified and an unfavorable influence is exerted on the track follow performance. Thus, the pitching mode resonant frequencies $\omega_1$ and $\omega_2$ of a HDD 10 at a rotational component of 75 Hz must be set at a different frequency region from the frequencies of these frequencies.

Figure 8A:
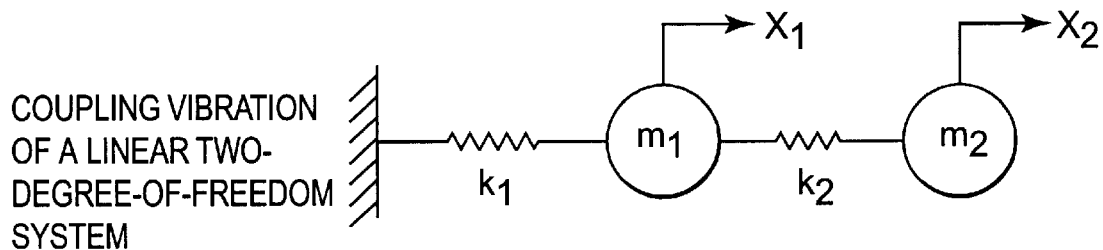
FIGS. 8 a–c are explanatory drawings illustrating the coupling vibration of a linear two-degree-of-freedom system, the coupling vibration for one disk loaded, and the coupling vibration for two disks loaded, respectively.

It will next be described how a coupled resonant frequency of this pitching mode resonant frequency with the (0, 1) resonant frequency can be modeled as a two degree-of-freedom spring-mass system of the HDD itself:

First, letting $k_1$, $k_2$ be spring constants, $m_1$, $m_2$ be masses, and $x_1$, $x_2$ be the absolute coordinates of movements, a coupled resonant frequency of the linear two degree-of-freedom system shown in FIG. 8a can be determined by solving the following simultaneous equations:

$$m_2 \ddot{x}_2 + k_2(x_2 - s_1) = 0$$

$$m_1 \ddot{x}_1 + k_1 x_1 - k_2(x_2 - x_1) = 0 \quad (1)$$

Here, upon substituting $x_1 = a_1 \cos(\omega t)$ and $x_2 = a_2 \cos(\omega t)$ and eliminating $a_1$ and $a_2$, the following vibrational equations are obtained:

$$\begin{vmatrix} k_2 - m_2 \omega^2 & -k_2 \\ -k_2 & k_1 + k_2 - m_1 \omega^2 \end{vmatrix} = 0 \quad (2)$$

Upon arranging the result, one gets $$(-\omega^2 + \omega_2^2)(-\omega^2 + \omega_1^2) - \omega_{12}^4 = 0 \quad (3)$$

where $$\omega_1^2 = \frac{k_1 + k_2}{m_1};$$

$$\omega_2^2 = \frac{k_2}{m_2};$$

$$\omega_{12}^2 = \frac{k_2}{\sqrt{m_1 m_2}} \quad (4)$$

Incidentally, in Eq. (3), $\omega_1$ and $\omega_2$ are natural angular frequencies of vibration to be generated at $m_1$ and $m_2$ with $m_1$ and $m_2$ being fixed, respectively.

Solving Eq. (3) for $\omega_2$ and letting $\omega_i^2$, $\omega_{ii}^2$ be the roots in increasing order, one gets:

$$\omega_i^2, \omega_{ii}^2 = \frac{1}{2}\left\{(\omega_1^2 + \omega_2^2) \pm \sqrt{(\omega_2^2 - \omega_1^2) + 4\omega_{12}^4}\right\} \quad (5)$$

In each of the equations mentioned above, the natural angular frequency $\omega$ corresponds to the resonant frequency ($f = \omega/2\pi$).

Figure 8B:
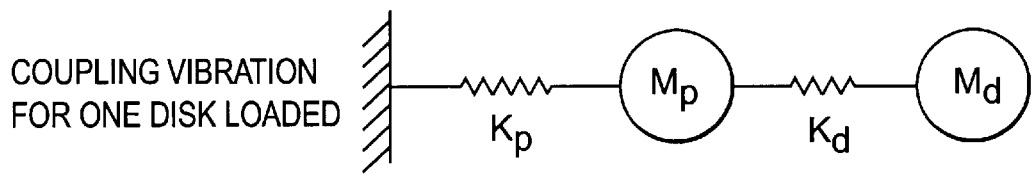

The modeling of a one magnetic disk version will be described next. As shown in FIG. 8b, $K_p$ denotes the spring constant of a spindle motor (corresponding to $k_1$ of FIG. 8a) and $M_p$ denotes the mass of a spindle motor (strictly speaking, the mass of a hub magnet assembly 90 and a shaft cartridge assembly 92) (corresponding to $m_1$ in FIG. 8a). $K_d$ denotes the spring constant of one magnetic disk (corresponding to $k_2$ in FIG. 8a) and $M_d$ denotes the mass of a magnetic disk (corresponding to $m_2$ in FIG. 8a). Further, let $K_{12}$, $M_{12}$ be the spring constant, the mass for a 1.27 t thick magnetic disk and $K_{08}$, $M_{08}$ be the spring constant, the mass for a 0.80 t thick magnetic disk. Let $F_p$, $F_{12}$, $F_{08}$ be the pitching mode resonant frequency, the (0, 1) resonant frequency of a 1.27 t thick magnetic disk, the (0, 1) resonant frequency of a 0.80 t thick magnetic disk, respectively. To make sure, all parameters related to this model is shown in Table 1.

TABLE 1

| | Spring constant | Mass | Resonant frequency |
|---|---|---|---|
| Spindle motor | $K_p$ | $M_p$ | $F_p$ |
| 1.27 t disk | $K_{12}$ | $M_{12}$ | $F_{12}$ |
| 0.80 t disk | $K_{08}$ | $M_{08}$ | $F_{08}$ |

In this model, the (0, 1) resonant frequency $F_{12}$ and (0, 1) resonant frequency $F_{08}$ are known as described above. The mass of the spindle motor $M_p$ and mass of a magnetic disk $M_{12}$, $M_{08}$ can be found by measurement. Further, the pitching mode resonant frequency $F_p$ can be measured using the hammer test mentioned above.

Thus, using Eqs. (3) and (5), the spring constant $K_{12}$ can be calculated from the (0, 1) resonant frequency $F_{12}$ and the mass $M_{12}$ of a magnetic disk and the spring constant $K_{08}$ can be calculated from the (0, 1) resonant frequency $F_{08}$ and the mass $M_{08}$ of a magnetic disk. Further, the spring constant $K_p$ of the spindle motor can be calculated from the pitching mode resonant frequency $F_p$ and the mass $M_p$.

Figure 8C:
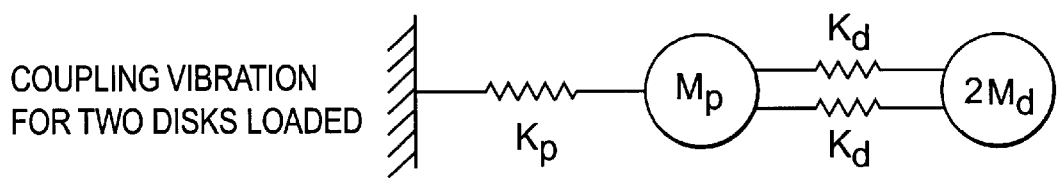

The modeling of a two-disk version will be described next. Since one and the same spindle motor is used for a one-disk version and for a two-disk version, the spring constant $K_p$ and mass $M_p$ of the spindle motor are the same as for a one-disk version. On modeling the spring constant $K_d$ and mass $M_d$ as shown in FIG. 8c, the natural angular frequency $\omega_2$ of the magnetic disks for two magnetic disks can be expressed in the following equation:

$$\omega_2^2 = \frac{2Kd}{2Md} = \frac{Kd}{Md} \quad (6)$$

The natural angular frequency $\omega_2$ shown by this equation (6) is the same as the one $\omega_2$ shown by the equation (3). In this way, a case of a two-disk version can be modeled as the coupled vibration of the linear two degree-of-freedom system shown in FIG. 8a. Thus, all modeled parameters can be determined the same as with the two-disk version.

TABLE 2

| Pitching mode resonant frequency at rest [Hz] | 1.27 t | | 0.80 t | |
|---|---|---|---|---|
| | One disk | Two disks | One disk | Two disks |
| Actual data | 733 | 655 | 543 | 510 |
| Estimated value | 765 | 670 | 578 | 549 |

Table 2 shows the data for the pitching mode resonant frequency at rest and the estimated values of the pitching mode resonant frequency at rest from the parameters obtained by the above-mentioned modeling. As described in Table 2, the measured values and estimated values closely approximate each other. Thus, it becomes possible to estimate the coupled resonant frequency of the HDD based on the model mentioned above.

As is evident from Eq.(3) and Eq.(5), the pitching mode resonant frequency of a spindle motor can be changed by adjusting the spring constant $K_p$. Factors that can change this spring constant include the diameter and material of the shaft 84, and the size of the bearings of the spindle motor 18, the preload applied in fixation of the ball bearings to the shaft 84 and the cartridge sleeve 86 with adhesives, and the vertical span over the ball bearings. Thus, the pitching mode resonant frequency can be changed by varying at least any one of these factors.

A HDD 10 according to the present embodiment is one selected and adjusted taking these factors into account so that the coupled resonant frequency may be much the same for a one-disk version and for a two-disk version. As shown in Table 2, since the difference in resonant frequency between a one-disk version and a two-disk version is smaller and the pitching mode resonant frequency is also easier to modify for a 0.80 t thick magnetic disk than for a 1.27 t thick magnetic disk, a 0.80 t thick magnetic disk is selected in the present embodiment.

In this way, since the coupled resonant frequency is made almost equal for a one-disk version and for a two-disk version by adjusting the pitching mode resonant frequency and (0, 1) resonant frequency, a HDD 10 according to the present embodiment can secure stable track following independently of the number of magnetic disks loaded.

Also, in preparing a lineup of HDD products, since an estimation for meeting stability during track following can be finished the first time, the period for development can be shortened and, moreover, since the parts of the spindle motor come to be of one type, labor can be saved in quality control.

To equate a coupled resonant frequency for one magnetic disk and for two magnetic disks, a spindle motor having a stable pitching mode resonant frequency is required. However, according to the conventional spindle motor mentioned above, since the variance in the state at completion is large, it was difficult to obtain a stable pitching mode resonant frequency.

Since the aforesaid factors determining the pitching mode resonant frequency can be controlled at the stage of assembly, a spindle motor 18 according to the present embodiment can secure a stable pitching mode resonant frequency. Thus, it becomes easy to equate the coupled mechanical resonant frequency independently of the number of magnetic disks loaded.

In addition, by adjusting factors able to be used to change the spring constant $K_d$ of a magnetic disk, such as the thickness of the magnetic disk, the material of the magnetic disk, the position of the clamp and clamping force so as to change the (0, 1) resonant frequency, the coupled resonant frequency can be equated for a one-disk version and for a two-disk version (cf. Eqs.(3) and (5)).

Also, the above-mentioned modeling is applicable to an HDD for three or more magnetic disk version (cf. FIG. 8c and Equation (6)).

Further, in the present embodiment, a ball bearing 82 as a direct ball bearing is employed as a component of the shaft cartridge assembly and grooving is performed on the shaft 84 and cartridge sleeve 86. However, two lots of single bearings may be used to constitute a shaft cartridge assembly.

Still further, the present embodiment shows the use of an overhang outer-ring rotating spindle motor, but is applicable also to a center inner-ring rotating spindle motor.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A disk drive apparatus, comprising:

a spindle motor, disposed within an enclosure, for driving a shaft at a predetermined rotational speed;

at least one disk with an inner periphery fixed on the shaft of said spindle motor;

at least one actuator assembly, disposed within the enclosure, for moving a head arm relative to the disk;

a magnetic head, coupled to the head arm, for writing or reading information while following a track of said disk; and a disk drive apparatus attachment structure for attaching the spindle motor and the disk to the disk drive apparatus, wherein the spindle motor and the disk are selected to minimize the difference in a first mechanical resonance frequency value and a second mechanical resonance frequency value, wherein the first and second mechanical resonance frequency values are derived from an artificial movement model, and wherein the artificial movement model determines the first mechanical resonance frequency associated with the coupling of the pitching mode mechanical resonance frequency of a no-load spindle motor and the primary mechanical resonance frequency of one disk to be loaded and the second mechanical resonance frequency associated with the coupling of the pitching mode mechanical resonance frequency of the no-load spindle motor and the primary mechanical resonance frequency of a plurality of disks to be loaded, so that the first mechanical resonance frequency and the second mechanical resonance frequency do not differ for one disk loaded and for plural disks loaded.

2. A disk drive apparatus attachment structure as set forth in claim 1, wherein said spindle motor has the shaft structure as a shaft assembly made into a cartridge-like subassembly by previously applying axial oppositely directed preloads to outer and inner rings of a bearing.

3. A disk drive apparatus, comprising:

a spindle motor, disposed within an enclosure, for driving a shaft at a predetermined rotational speed;

at least one disk with an inner periphery fixed on the shaft of said spindle motor;

at least one actuator assembly, disposed within the enclosure, for moving a head arm relative to the disk;

a magnetic head, coupled to the head arm, for writing or reading information while following a track of said disk; and a disk drive apparatus attachment structure for attaching the spindle motor and the disk to the disk drive apparatus, wherein shaft parameters are adjusted based on parameters obtained from a free vibration model with a spring-mass system that a pair comprising the pitching mode mechanical resonance frequency of a no-load spindle motor and the primary mechanical resonance frequency of the disks loaded has been transformed so that the mechanical resonance frequency determined by coupling the pitching mode mechanical resonance frequency of the disk loading spindle motor with the primary mechanical resonance frequency of disks to be loaded is the same for one disk loaded and for plural disks loaded.

4. The disk drive apparatus of claim 3, wherein the shaft parameters comprise at least one of the diameter of the shaft of the spindle motor, the material of said shaft, the size of a bearing for holding said shaft by clamping, the pressure applied to said bearing, the span over the bearing, the thickness of the disks, the material of the disks, disk clamping position, and a disk clamping force.

5. The disk drive apparatus attachment structure as set forth in claim 4, wherein said spindle motor has the shaft structure as a shaft assembly made into a cartridge-like subassembly by previously applying axial oppositely directed preloads to outer and inner rings of a bearing.

6. The disk drive apparatus attachment structure as set forth in claim 3, wherein said spindle motor has the shaft structure as a shaft assembly made into a cartridge-like subassembly by previously applying axial oppositely directed preloads to outer and inner rings of a shaft bearing.

7. A disk drive apparatus, comprising:
a spindle motor, disposed within an enclosure, for driving a shaft at a predetermined rotational speed;
at least one disk with an inner periphery fixed on the shaft of said spindle motor;
at least one actuator assembly, disposed within the enclosure, for moving a head arm relative to the disk; and
a magnetic head, coupled to the head arm, for writing or reading information while following a track of said disk;
wherein said spindle motor includes a cartridge-like subassembly made by previously applying axial opposingly directed preloads to outer and inner rings of a bearing based on parameters obtained from a free vibration model with a spring-mass system in which a pair comprising the pitching mode mechanical resonance frequency of a no-load spindle motor and the primary mechanical resonance frequency of the disks loaded has been transformed so that the mechanical resonance frequency determined by coupling the pitching mode mechanical resonance frequency of the disk loading spindle motor with the primary mechanical resonance frequency of disks to be loaded is the same for one disk loaded and for plural disks loaded.

8. A disk drive apparatus, comprising:
a spindle motor, disposed within an enclosure, for driving a shaft at a predetermined rotational speed;
at least one disk with an inner periphery fixed on the shaft of said spindle motor;
at least one actuator assembly, disposed within the enclosure, for moving a head arm relative to the disk;
a magnetic head, coupled to the head arm, for writing or reading information while following a track of said disk; and
a disk drive apparatus attachment structure for attaching the spindle motor and the disk to the disk drive apparatus, the attachment structure comprising:
means for adjusting at least one of the diameter of the shaft of the spindle motor, the material of said shaft, the size of a bearing for holding said shaft by clamping, the pressure applied to said bearing, the span over the bearing, the thickness of the disks, the material of the disks, disk clamping position, and the disk clamping force based on parameters obtained from a free vibration model with a spring-mass system that a pair comprising the pitching mode mechanical resonance frequency of a no-load spindle motor and the primary mechanical resonance frequency of the disks loaded has been transformed so that the mechanical resonance frequency determined by coupling the pitching mode mechanical resonance frequency of the disk loading spindle motor with the primary mechanical resonance frequency of disks to be loaded is the same for one disk loaded and for plural disks loaded.

9. A method for preventing instability of track following of a magnetic head using one and the same enclosure case in a product lineup, independent of the number of disks, comprising the steps of:
determining a first mechanical resonance frequency associated with the coupling of the pitching mode mechanical resonance frequency of a no-load spindle motor and the primary mechanical resonance frequency of one disk to be loaded;
determining a second mechanical resonance frequency associated with the coupling of the pitching mode mechanical resonance frequency of the no-load spindle motor and the primary mechanical resonance frequency of a plurality of disks to be loaded; and
selecting the spindle motor and the disk to minimize the difference in the first mechanical resonance frequency value and the second mechanical resonance frequency value.

10. The method of claim 9 wherein said spindle motor has the shaft structure as a shaft assembly made into a cartridge-like subassembly by previously applying axial opposingly directed preloads to outer and inner rings of a bearing.

* * * * *